March 18, 1952     C. L. HARMSEN     2,589,376
WHEELED CARRIER FOR OUTBOARD MOTORS
Filed July 5, 1949
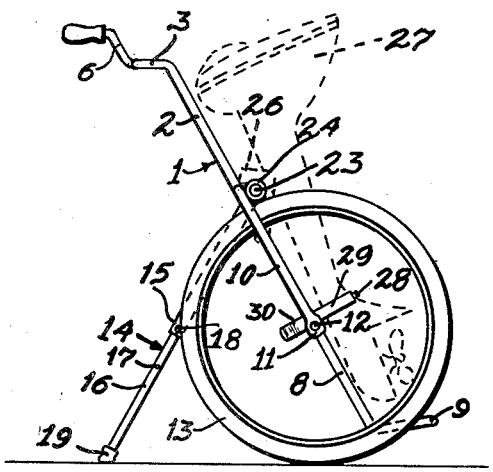
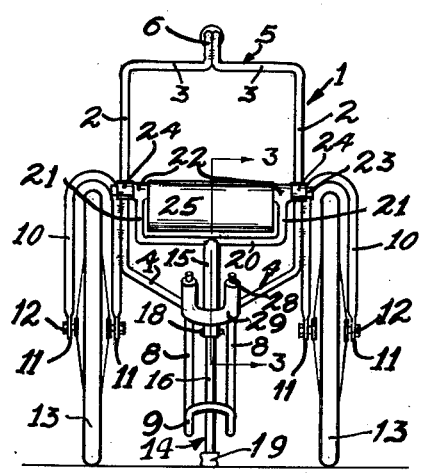
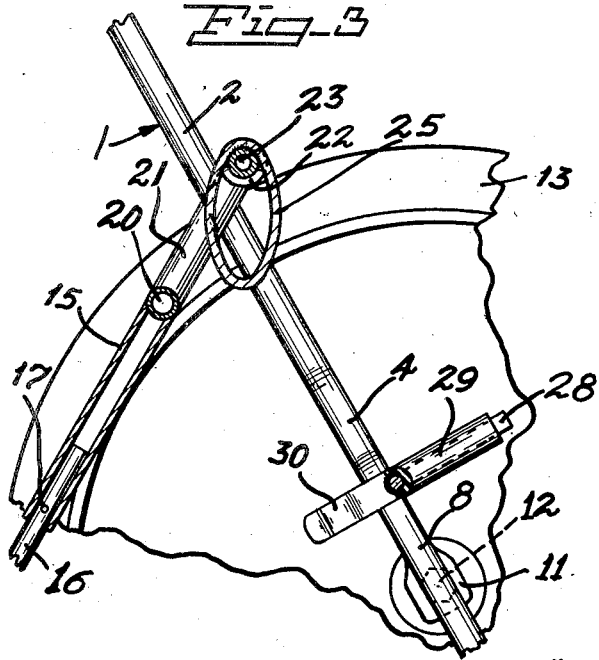
Inventor
Carl L. Harmsen
By
Attorney Patented Mar. 18, 1952

2,589,376

UNITED STATES PATENT OFFICE 2,589,376

WHEELED CARRIER FOR OUTBOARD MOTORS

Carl L. Harmsen, Spokane, Wash.

Application July 5, 1949, Serial No. 103,009

1 Claim. (Cl. 280—53)

This invention relates to a wheeled carriage or trundle truck by means of which an outboard motor may be easily and conveniently moved from one place to another.

An outboard motor is difficult to lift and carry from one place to another as it is heavy and also can not be easily evenly balanced when carried upon a person's shoulder or in front of a person. Therefore it is one object of the invention to provide a wheeled carriage so constructed that an outboard motor may be mounted thereon and so secured that it will not be liable to slip off of the carriage while the carriage is being moved to transport the motor.

Another object of the invention is to provide a carriage having a frame supported by two wheels spaced from each other transversely of the frame, means being provided between the wheels for detachably mounting the motor in such position that it will be held in upwardly spaced relation to the ground upon which the wheels rest and transverse tilting of the carriage by weight of the motor prevented.

Another object of the invention is to provide a carriage adapted to be tilted vertically about the axles of its wheels and thus allow the carriage to assume an angle which will be convenient to the person using the carriage to transport a motor.

Another object of the invention is to provide a frame which is strongly braced against transverse strains and is provided with props by means of which the frame may be supported in an upright but rearwardly inclined position while a motor is being mounted upon or removed from the carriage.

Another object of the invention is to provide a carriage which is formed of metal tubing and is therefore very strong but of light weight and may be easily rolled upon its wheels from one place to another.

The invention is illustrated in the accompanying drawings wherein:

Fig. 1 is a side elevation of the improved outboard motor carriage, a motor mounted thereon being indicated by dotted lines.

Fig. 2 is a front elevation of the carriage.

Fig. 3 is a fragmentary sectional view upon an enlarged scale taken along the line 3—3 of Figure 2.

This carriage has a frame or body 1 which is formed of metal tubing of light weight, such as alluminum, and has side bars 2 bent to form upper and lower arms 3 and 4. The upper arms 3 extend rearwardly and then towards each other and meet midway the width of the frame to form an upper cross bar 5 where they are disposed in side by side engagement with each other and bent to form a handle 6 having a hand grip mounted upon its rear end and the lower arms 4 converge downwardly to a point in spaced relation to each other where the metal tubing is bent to form legs 8 spaced transversely from each other and connected at their lower ends by a U-shaped foot 9 projecting forwardly therefrom. Forks 10 of inverted U-shape and formed of metal tubing are disposed vertically at opposite sides of the frame with their inner portions welded against the side bars 2. When viewed in front elevation the forks project transversely of the frame and the lower portions of the forks project downwardly from lower ends of the side bars and terminate in flattened lower ends 11 which are formed with perforations to receive axles 12 of wheels 13 which are of the type used upon bicycles. Since the wheels are spaced in appreciable distance from opposite sides of the pair of legs 8 the carriage will be prevented from tilting transversely and falling over during use thereof. Since the wheels are rotatably mounted by axles carried by lower ends of the forks the frame may be tilted forwardly and rearwardly in a vertical direction and the handle disposed in such position that it may be conveniently grasped and the carriage rolled along the ground to transport a motor from one place to another.

When a motor is being applied to the carriage and removed therefrom the carriage should be supported upright as shown in Figure 1. In order to do so there has been provided a prop 14. This prop has a tubular upper section 15 and a lower section 16 which telescopes into the upper section and is formed with plurality of longitudinally spaced openings 17 so that by passing a pin 18 through the upper section and through a selected one of the openings 17 the prop may be adjusted for length and the frame supported at a desired vertical angle when the foot 19 of the prop is at rest upon the ground. The upper end of the prop is welded to a yoke 20 which is also formed of metal tubing and has upwardly projecting arms 21 terminating at sleeves 22 loosely engaged about a bar 23 which extends horizontally between the side bars 2 of the frame 1 and at its ends passed through sleeves 24 which are welded upon the bar and also welded to the side bars of the frame and upper portions of the inner arms of the forks 10. During application of the yoke to the bar 23 a sleeve or cuff 25 which is formed of metal and oval in cross section is mounted upon the bar between the sleeves 22 and as this cuff is oval in cross section and considerably larger in cross section than the bar is will be suspended upon the bar in depending relation thereto, as shown in Figure 3, and form a very good saddle for engagement by the bracket 26 of an outboard motor 27. The motor extends longitudinally of the frame and its legs and the lower portion of the motor is engaged between the forwardly projecting arms of a U-shaped bracket 28. This bracket is mounted rigidly upon the legs 8 and covered with rubber hose 29 and upon the bridge portion at its rear end carries a resilient clip 30 which projects rearwardly therefrom so that when the prop is swung forwardly it may be gripped by the clip and releasably held in the retracted position.

When this carriage is in use it is rolled to a position near a motor to be transported and the prop swung rearwardly to an extended position and longitudinally adjusted so that with its foot resting upon the ground it will support the frame at a desired rearward angle. The motor is then lifted and applied to the carriage with its bracket 26 resting upon the sleeve or cuff 25 in straddling engagement therewith and the lower portion of the drive shaft casing of the motor fitted between arms of the U-shaped bracket 29 and the lower end of the motor disposed over the foot 9 of the frame in upward spaced relation thereto. The handle 6 is then grasped by its grip 7 and the frame tilted forwardly and the prop swung to its retracted position where it is held by the resilient clip and the carriage then pushed forwardly to the place to which the motor is to be transported. The prop is then swung rearwardly to its extended position and the frame will be again supported at a rearward incline and the motor may be lifted from the carriage without difficulty. Since the foot 9 is disposed under the lower end of the motor it will prevent the motor casing and the propeller from being damaged by contact with the ground during transportation of the motor from one place to another and as the wheels are spaced from the motor transversely thereof the carriage will not be liable to tilt transversely and fall over while the carriage is being pushed along rough ground. Since the weight of the motor is midway the width of the carriage the carriage will be evenly balanced and may be very easily swung transversely for turning right or left movements.

Having thus described the invention, what is claimed is:

An outboard motor carriage comprising a frame formed of tubing bent to form side bars and upper and lower arms extending inwardly from the side bars, the upper arms meeting midway the width of the frame to form an upper cross bar and being bent to form a handle extending rearwardly from the frame, the lower arms extending towards each other and then downwardly to form legs spaced transversely from each other and connected at their lower ends by a forwardly projecting foot, forks of inverted U-shape mounted against outer side portions of the side bars and projecting downwardly therefrom, ground-engaging wheels rotatably mounted in said forks and mounting the frame for vertical tilting movement to angularly adjusted positions, a suspension bar extending transversely of said frame and having its ends rigidly connected with the side bars of the frame, a sleeve loose about said suspension bar, said sleeve being oval in cross section and extending downwardly from the bar and constituting a member disposed in position to support an outboard motor upright in front of the frame with the lower portion of the motor directly in front of the legs, a U-shaped bracket carried by and projecting forwardly from the legs for engaging the lower portion of the motor and preventing movement thereof transversely of the legs from a position over said foot, a yoke straddling said sleeve and having upwardly extending arms loosely mounted about the suspension bar, a longitudinally adjustable prop extending downwardly from the yoke midway the width thereof.

CARL L. HARMSEN.

REFERENCES CITED

The following references are of record in the file of this patent:

UNITED STATES PATENTS

| Number | Name | Date |
|---|---|---|
| 525,954 | Kinder | Sept. 11, 1894 |
| 1,667,671 | Nies | Apr. 24, 1928 |
| 1,747,600 | Reardon | Feb. 18, 1930 |
| 1,790,711 | Johnston | Feb. 3, 1931 |
| 1,795,812 | Whiting | Mar. 10, 1931 |
| 2,414,946 | Hammermiller | Jan. 28, 1947 |
| 2,468,390 | Binz | Apr. 26, 1949 |
| 2,484,227 | Houk et al. | Oct. 11, 1949 |

FOREIGN PATENTS

| Number | Country | Date |
|---|---|---|
| 186,220 | Great Britain | Sept. 28, 1922 |
| 216,249 | Great Britain | May 29, 1924 |
| 327,792 | Great Britain | Apr. 17, 1930 |